(12) United States Patent
Mori et al.

(10) Patent No.: US 8,030,406 B2
(45) Date of Patent: Oct. 4, 2011

(54) RUBBER COMPOSITION AND PNEUMATIC TIRE USING THE SAME

(75) Inventors: Noriko Mori, Kodaira (JP); Eiji Suzuki, Kodaira (JP); Kouji Masaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 499 days.

(21) Appl. No.: 11/817,573

(22) PCT Filed: Feb. 23, 2006

(86) PCT No.: PCT/JP2006/003429
§ 371 (c)(1),
(2), (4) Date: Sep. 18, 2007

(87) PCT Pub. No.: WO2006/093048
PCT Pub. Date: Sep. 8, 2006

(65) Prior Publication Data
US 2008/0289740 A1  Nov. 27, 2008

(30) Foreign Application Priority Data

Mar. 4, 2005  (JP) ................................. 2005-060634
Aug. 5, 2005  (JP) ................................. 2005-228035

(51) Int. Cl.
C08L 9/00   (2006.01)
C08L 25/02  (2006.01)
C08L 33/02  (2006.01)
C08L 35/00  (2006.01)
C08L 39/04  (2006.01)
C08L 43/00  (2006.01)
C08L 45/00  (2006.01)

(52) U.S. Cl. ........ 525/201; 525/203; 525/211; 525/217; 525/232; 525/241

(58) Field of Classification Search .................. 525/201, 525/203, 211, 217, 232, 241
See application file for complete search history.

(56) References Cited

U.S. PATENT DOCUMENTS 5,902,856 A * 5/1999 Suzuki et al. ................. 525/237
7,262,254 B2 * 8/2007 Zanzig ....................... 525/331.9
2010/0016496 A1 * 1/2010 Tanaka et al. ................. 524/506

FOREIGN PATENT DOCUMENTS

| EP | 0 510 410 A1 | 10/1992 |
| EP | 0 794 224 A1 | 9/1997 |
| EP | 0 818 478 A1 | 1/1998 |
| EP | 0 850 989 A1 | 7/1998 |
| EP | 1 318 172 A1 | 6/2003 |
| JP | 58-167633 A | 10/1983 |
| JP | 6-65418 A | 3/1994 |
| JP | 7053784 A | 2/1995 |
| JP | 8073657 A | 3/1996 |
| JP | 9278844 A | 10/1997 |
| JP | 2001-114970 A | 4/2001 |
| JP | 2002-121326 A | 4/2002 |
| JP | 2002-179729 A | 6/2002 |
| JP | 2003-176378 A | 6/2003 |
| JP | 2005-146115 A | 6/2005 |
| WO | 8705610 A1 | 9/1987 |
| WO | 96/16118 A1 | 5/1996 |
| WO | 97/48766 A1 | 12/1997 |

OTHER PUBLICATIONS

Decision of Rejection issued Jul. 19, 2011 in counterpart Chinese Application No. 200680012827.8.
Notification of Reasons for Refusal dated May 24, 2011 issued in counterpart Japanese Application No. JP2005-060634.
Notification of Reasons for Refusal dated May 24, 2011 issued in counterpart Japanese Application No. JP2005-228035.

* cited by examiner

*Primary Examiner* — Nathan M Nutter
(74) *Attorney, Agent, or Firm* — Sughrue Mion, PLLC

(57) ABSTRACT

This invention relates to a rubber composition having a high storage modulus (G') and a low loss tangent (tan δ), and more particularly to a rubber composition comprising 2 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 5 to 80% by mass, a weight average molecular weight as measured through a gel permeation chromatography and converted to polystyrene of 5,000 to 500,000 and at least one functional group based on 100 parts by mass of a rubber component (A) composed of at least one of natural rubber and synthetic diene-based rubbers.

13 Claims, No Drawings

RUBBER COMPOSITION AND PNEUMATIC TIRE USING THE SAME

TECHNICAL FIELD

This invention relates to a rubber composition and a pneumatic tire using the rubber composition in at least a ground-contacting part of a tread portion, and more particularly to a rubber composition having a high storage modulus (G') and a low loss tangent (tan δ).

BACKGROUND ART

Lately, there is a strong demand to reduce fuel consumption of automobiles in connection with a worldwide effluent control of carbon dioxide associated with a growing interest in environmental problems. In order to cope with such a demand, there is a need to reduce the rolling resistance of a tire. As a means for reducing the rolling resistance of the tire, it is effective to use a rubber composition having a smaller loss tangent (tan δ) and a low heat buildup as a rubber composition applied to a tread portion of the tire.

On the other hand, as a rubber composition applied to the tread portion of the tire, it is preferable that a rubber composition having a high storage modulus (G'). Thus, there is a need for a rubber composition having a low loss tangent (tan δ) and a high storage modulus (G'). In this context, as a means for improving the storage modulus (G') of the rubber composition, there is a known method wherein an amount of carbon black compounded in the rubber composition is increased, a technique wherein a bismaleimide (BMI) having a specified structure such as N,N'-(4,4'-diphenylmethane)-bismaleimide or the like is compounded as described in JP-A-2002-121326, and a technique wherein a compound having both a reactive group for a rubber component and an adsorption group for a filler such as polyethylene glycol dimaleate (PEGM) or the like is compounded as described in JP-A-2003-176378.

DISCLOSURE OF THE INVENTION

However, when the amount of the carbon black compounded in the rubber composition is increased, the storage modulus (G') of the rubber composition can be improved, but the loss tangent (tan δ) of the rubber composition simultaneously rises to deteriorate the low heat buildup of the rubber composition. Further, there is a problem that a Mooney viscosity of the rubber composition rises to deteriorate processability.

Also, when the bismaleimide (BMI) or the compound having the reactive group for the rubber component and the adsorption group for the filler is compounded into the rubber composition, the storage modulus (G') of the rubber composition can be improved, but the loss tangent (tan δ) of the rubber composition is approximately equivalent and the low heat buildup of the rubber composition cannot be sufficiently improved.

It is, therefore, an object of the invention to solve the above-mentioned problems of the conventional techniques and to provide a rubber composition having a high storage modulus (G') and a low loss tangent (tan δ). Also, it is another object of the invention to provide a pneumatic tire using such a rubber composition in at least a ground-contacting part of a tread portion.

The inventors have made various studies in order to achieve the above objects and discovered that the loss tangent (tan δ) of the rubber composition can be considerably lowered while highly improving the storage modulus (G') by using a relatively low-molecular weight aromatic vinyl compound-conjugated diene compound copolymer having specified aromatic vinyl compound content, vinyl bond content and weight average molecular weight and at least one functional group instead of a commonly used softening agent such as aromatic oil or the like in the rubber composition, and as a result the invention has been accomplished.

That is, the rubber composition according to the invention comprises 2 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 5 to 80% by mass, a weight average molecular weight as measured through a gel permeation chromatography and converted to polystyrene of 5,000 to 500,000 and at least one functional group based on 100 parts by mass of a rubber component (A) composed of at least one of natural rubber and synthetic diene-based rubbers.

In the rubber composition according to the invention, it is preferable that the low-molecular weight aromatic vinyl compound-conjugated diene compound copolymer (B) be formed through a modification with a tin-containing compound, a silicon-containing compound or a nitrogen-containing compound.

In a preferable embodiment of the rubber composition according to the invention, the functional group of the low-molecular weight aromatic vinyl compound-conjugated diene compound copolymer (B) is a tin-containing functional group, a silicon-containing functional group or a nitrogen-containing functional group.

In another preferable embodiment of the rubber composition according to the invention, not less than 50% by mass of the rubber component (A) is styrene-butadiene copolymer rubber. In this case, the effects of improving the storage modulus (G') and lowering the loss tangent (tan δ) by compounding the low-molecular weight copolymer (B) become remarkable.

In the other preferable embodiment of the rubber composition according to the invention, the aromatic vinyl compound in the low-molecular weight aromatic vinyl compound-conjugated diene compound copolymer (B) is styrene.

In a further preferable embodiment of the rubber composition according to the invention, the conjugated diene compound in the low-molecular weight aromatic vinyl compound-conjugated diene compound copolymer (B) is 1,3-butadiene.

The rubber composition according to the invention preferably further contains 30 to 90 parts by mass of a filler based on 100 parts by mass of the rubber component (A). In this case, the workability of the rubber composition is good and further fracture characteristics and wear resistance of a vulcanized rubber obtained by vulcanizing the rubber composition are sufficiently high. Moreover, it is more preferable that the filler is carbon black and/or silica.

In another preferable embodiment of the rubber composition according to the invention, a total amount of the low-molecular weight aromatic vinyl compound-conjugated diene compound copolymer (B) and a softening agent compounded is 2 to 80 parts by mass based on 100 parts by mass of the rubber component (A). In this case, the fracture characteristics of the vulcanized rubber obtained by vulcanizing the rubber composition are sufficiently high.

In the rubber composition according to the invention, the low-molecular weight aromatic vinyl compound-conjugated diene compound copolymer (B) preferably has a weight average molecular weight as measured with a gel permeation chromatography and converted to polystyrene of 20,000 to 400,000, more preferably 50,000 to 400,000.

In the rubber composition according to the invention, the low-molecular weight aromatic vinyl compound-conjugated diene compound copolymer (B) preferably has a weight average molecular weight as measured through a gel permeation chromatography prior to the introduction of the functional group and converted to polystyrene of 5,000 to 200,000, more preferably 20,000 to 150,000, even more preferably 50,000 to 150,000.

In the rubber composition according to the invention, it is preferable that the low-molecular weight aromatic vinyl compound-conjugated diene compound copolymer (B) has a glass transition point (Tg) of not higher than 0° C.

In another preferable embodiment of the rubber composition according to the invention, the low-molecular weight aromatic vinyl compound-conjugated diene compound copolymer (B) is formed through a polymerization using an organic alkaline metal compound or a rare-earth metal compound. Moreover, as the organic alkaline metal compound, alkyllithium is preferred.

In the rubber composition according to the invention, as the nitrogen-containing functional group of the low-molecular weight aromatic vinyl compound-conjugated diene compound copolymer (B) a substituted or unsubstituted amino group, amide group, imino group, imidazole group, nitrile group and pyridyl group, and particularly a substituted amino group represented by the following formula (I):

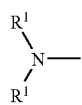

(I)

[wherein $R^1$ is independently an alkyl group having a carbon number of 1-12, a cycloalkyl group or an aralkyl group] is preferred, and a cyclic amino group represented by the following formula (II):

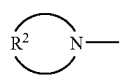

(II)

[wherein $R^2$ is an alkylene group having 3-16 methylene groups, a substituted alkylene group, an oxyalkylene group or a N-alkylamino-alkylene group] is more preferable. These nitrogen-containing functional groups have a high effect on dispersing the filler in the rubber composition compounded with various fillers such as carbon black, silica, aluminum hydroxide and so on, and can considerably lower the loss tangent (tan δ) of the rubber composition having any formulation while highly improving the storage modulus (G').

Also, the pneumatic tire according to the invention is characterized in that the above rubber composition is used in at least a ground-contacting part of a tread portion.

According to the invention, there can be provided a rubber composition having a high storage modulus (G') and a low loss tangent (tan δ) and using a liquid low-molecular weight aromatic vinyl compound-conjugated diene compound copolymer having specified aromatic vinyl compound content, vinyl bond content and weight average molecular weight and at least one functional group. Also, there can be provided a pneumatic tire using such a rubber composition in at least a ground-contacting part of a tread portion.

BEST MODE FOR CARRYING OUT THE INVENTION

The invention will be described in detail below. The rubber composition according to the invention comprises 2 to 60 parts by mass of a low-molecular weight aromatic vinyl compound-conjugated diene compound copolymer (B) having an aromatic vinyl compound content of 5 to 80% by mass, a vinyl bond content in a conjugated diene compound portion of 5 to 80% by mass, a weight average molecular weight as measured through a gel permeation chromatography and converted to polystyrene of 5,000 to 500,000 and at least one functional group based on 100 parts by mass of a rubber component (A) composed of at least one of natural rubber and synthetic diene-based rubbers.

The inventors have studied and discovered that the loss tangent (tan δ) of the rubber composition can be lowered without deteriorating the workability while improving the storage modulus (G') by compounding into the rubber composition a low-molecular weight aromatic vinyl compound-conjugated diene compound copolymer having an aromatic vinyl compound content of 5 to 80% by mass, a vinyl bond content in a conjugated diene compound portion of 5 to 80% by mass and a weight average molecular weight as measured through a gel permeation chromatography and converted to polystyrene of 5,000 to 500,000 instead of a softening agent such as aromatic oil or the like, and the loss tangent (tan δ) of the rubber composition can be further lowered while further improving the storage modulus (G') by using the copolymer (B) having at least one functional group obtained by modifying such a low-molecular weight aromatic vinyl compound-conjugated diene compound copolymer.

The rubber component (A) of the rubber composition according to the invention is composed of at least one of natural rubber (NR) and synthetic diene-based rubbers. As the rubber component (A) any of unmodified and modified rubbers may be used. As the synthetic diene-based rubber one synthesized through emulsion polymerization or solution polymerization is preferable. Examples of the synthetic diene-based rubber include polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR) and so on. Natural rubber, polyisoprene rubber, styrene-butadiene copolymer rubber and polybutadiene rubber are preferable as the rubber component (A) and it is more preferable that not less than 50% by mass of the rubber component (A) is styrene-butadiene copolymer rubber. When not less than 50% by mass of the rubber component (A) is styrene-butadiene copolymer rubber, the effects of improving the storage modulus (G') and lowering the loss tangent (tan δ) by compounding the low-molecular weight aromatic vinyl compound-conjugated diene compound copolymer (B) are remarkable. These rubber components may be used alone or in a blend of two or more. Moreover, from a viewpoint of wear resistance and heat resistance of the rubber composition, rubber component (A) preferably has a glass transition point (Tg) of not lower than −60° C.

The rubber composition according to the invention comprises 2 to 60 parts by mass of the low-molecular weight aromatic vinyl compound-conjugated diene compound copolymer (B) having an aromatic vinyl compound content of 5 to 80% by mass, a vinyl bond content in a conjugated diene compound portion of 5 to 80% by mass, a weight average molecular weight as measured with a gel permeation chromatography and converted to polystyrene of 5,000 to 500,000 and at least one functional group based on 100 parts by mass of the rubber component (A). When the amount of the low-molecular weight aromatic vinyl compound-conjugated diene compound copolymer (B) compounded is less than 2 parts by mass, the workability of the rubber composition is deteriorated, while when it exceeds 60 parts by mass, the fracture characteristics of the vulcanized rubber tend to be deteriorated.

The low-molecular weight aromatic vinyl compound-conjugated diene compound copolymer (B) is required to have an aromatic vinyl compound content of 5 to 80% by mass. When the aromatic vinyl compound content is less than 5% by mass or exceeds 80% by mass, the improvement of the storage modulus (G') and the lowering of the loss tangent (tan δ) in the rubber composition cannot be sufficiently and simultaneously established.

Also, the low-molecular weight aromatic vinyl compound-conjugated diene compound copolymer (B) is required to have a vinyl bond content in a conjugated diene compound portion of 5 to 80% by mass. When the vinyl bond content in the conjugated diene compound portion is less than 5% by mass or exceeds 80% by mass, the improvement of the storage modulus (G') and the lowering of the loss tangent (tan δ) of the rubber composition cannot be sufficiently and simultaneously established.

Furthermore, the low-molecular weight aromatic vinyl compound-conjugated diene compound copolymer (B) has a weight average molecular weight as converted to polystyrene of 5,000 to 500,000, preferably 20,000 to 400,000, more preferably 50,000 to 400,000. When the weight average molecular weight is less than 5,000, the storage modulus (G') of the rubber composition is deteriorated and the loss tangent (tan δ) of the rubber composition tends to rise, while when it exceeds 500,000, the workability of the rubber composition is deteriorated. Moreover, the low-molecular weight aromatic vinyl compound-conjugated diene compound copolymer (B) preferably has a weight average molecular weight as measured through a gel permeation chromatography before the introduction of the functional group and converted to polystyrene of 5,000 to 200,000, more preferably 20,000 to 150,000, even more preferably 50,000 to 150,000. In this case, it is easy to improve the storage modulus (G'), lower the loss tangent (tan δ) and ensure the workability of the rubber composition by making the weight average molecular weight after the introduction of the functional group within a range of 5,000 to 500,000.

The low-molecular weight aromatic vinyl compound-conjugated diene compound copolymer (B) can be obtained through (1) a method comprising copolymerizing the aromatic vinyl compound and conjugated diene compound as the monomer with the polymerization initiator to produce an aromatic vinyl compound-conjugated diene compound copolymer having a polymerization active site and then modifying the polymerization active site with various modifying agents, or (2) a method comprising copolymerizing the aromatic vinyl compound and conjugated diene compound as the monomer with a polymerization initiator having a functional group. The aromatic vinyl compound-conjugated diene compound copolymer having the polymerization active site may be one produced through an anionic polymerization or a coordination polymerization. As the aromatic vinyl compound, styrene, p-methylstyrene, m-methylstyrene, p-tert-butyl styrene, α-methylstyrene, chloromethyl styrene, vinyl toluene and so on are mentioned. Among them, styrene is preferable. On the other hand, as the conjugated diene compound, 1,3-butadiene, isoprene, 1,3-pentadiene, 2,3-dimethylbutadiene and so on are mentioned. Among them, 1,3-butadiene is preferable.

When the aromatic vinyl compound-conjugated diene compound copolymer having the polymerization active site is produced through the anionic polymerization, it is preferable that as the polymerization initiator, an organic alkaline metal compound, and more preferably a lithium compound is used. As the lithium compound, a hydrocarbyl lithium, a lithium amide compound and so on are mentioned. When the hydrocarbyl lithium is used as the polymerization initiator, the copolymer having a hydrocarbyl group at a polymerization starting terminal and a polymerization active site at another terminal can be obtained. On the other hand, when the lithium amide compound is used as the polymerization initiator, the copolymer having a nitrogen-containing functional group at a polymerization starting terminal and a polymerization active site at another terminal can be obtained, which can be used as the low-molecular weight copolymer (B) in the invention even if it is not modified with the modifying agent. Moreover, the amount of the organic alkaline metal compound used as the polymerization initiator is preferably within a range of 0.2 to 20 mmol per 100 g of the monomer.

As the hydrocarbyl lithium, ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on are mentioned. Among them, alkyllithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

On the other hand, as the lithium amide compound, lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide and so on are mentioned. Among them, cyclic lithium amide compounds such as lithium hexamethylene imide, lithium pyrrolidide, lithium piperidide, lithium heptamethylene imide, lithium dodecamethylene imide and so on are preferable, and lithium hexamethylene imide and lithium pyrrolidide are particularly preferable.

The low-molecular weight aromatic vinyl compound-conjugated diene compound copolymer (B) introduced with at least one nitrogen-containing functional group selected from the group consisting of the substituted amino group represented by the formula (I) and the cyclic amino group represented by the formula (II) can be obtained by using a lithium amide compound represented by the formula: Li-AM [wherein AM is the substituted amino group represented by the formula (I) or the cyclic amino group represented by the formula (II)] as the lithium amide compound.

In the formula (I), $R^1$ is an alkyl group having a carbon number of 1-12, a cycloalkyl group or an aralkyl group and concretely includes methyl group, ethyl group, butyl group, octyl group, cyclohexyl group, 3-phenyl-1-propyl group, isobutyl group and so on. Moreover, $R^1$'s may be same or different.

In the formula (II), $R^2$ is an alkylene group having 3-16 methylene groups, a substituted alkylene group, an oxyalkylene group or a N-alkylamino-alkylene group. At this moment, the substituted alkylene group includes monosubstituted to octasubstituted alkylene groups and as a substituent are mentioned a linear or branched alkyl group having a carbon number of 1-12, a cycloalkyl group, a bicycloalkyl group, an aryl group and an aralkyl group. As $R^2$, trimethylene group, tetramethylene group, hexamethylene group, oxydiethylene group, N-alkylazadiethylene group, dodecamethylene group, hexadecamethylene group and the like are preferable.

The lithium amide compound may be previously prepared from a secondary amine and the lithium compound and used for the polymerization reaction, or may be produced in the polymerization system. As the secondary amine, dimethyl amine, diethyl amine, dibutyl amine, dioctyl amine, dicyclohexyl amine, diisobutyl amine and the like are mentioned, as well as cyclic amines such as azacycloheptane (i.e., hexamethylene imine), 2-(2-ethylhexyl)pyrrolidine, 3-(2-propyl) pyrrolidine, 3,5-bis(2-ethylhexyl)piperidine, 4-phenyl piperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, 1,5,5-trimethyl-3-azabicyclo[4.4.0]decane and the like. On the other hand, as the lithium compound, the above-described hydrocarbyl lithium may be used.

The method for producing the aromatic vinyl compound-conjugated diene compound copolymer through the anionic polymerization by using as the polymerization initiator the organic alkaline metal compound or the like is not particularly limited. For example, the copolymer can be produced by polymerizing a mixture of the conjugated diene compound and aromatic vinyl compound in a hydrocarbon solvent inactive to the polymerization reaction. As the hydrocarbon solvent inactive to the polymerization reaction, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on are mentioned. They may be used alone or in a combination of two or more.

The anionic polymerization may be carried out in the presence of a randomizer. The randomizer can control the microstructure of the conjugated diene compound portion in the copolymer, and more concretely has an action that the vinyl bond content of the conjugated diene compound portion in the copolymer is controlled, the conjugated diene compound unit and aromatic vinyl compound unit in the copolymer are randomized, or the like. As the randomizer, dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on are mentioned. The amount of the randomizer used is preferably within a range of 0.01 to 100 molar equivalent per 1 mol of the polymerization initiator.

The anionic polymerization is preferably carried out through solution polymerization. The concentration of the monomer in the polymerization reaction solution is preferably within a range of 5 to 50% by mass, more preferably 10 to 30% by mass. Moreover, the content of the aromatic vinyl compound in the mixture of the conjugated diene compound and aromatic vinyl compound is preferably within a range of 5 to 80% by mass, and can be properly selected depending on the aromatic vinyl compound content of the target copolymer (B). Also, the polymerization system is not particularly limited and may be a batch system or a continuous system.

The polymerization temperature in the anionic polymerization is preferably within a range of 0 to 150° C., more preferably 20 to 130° C. Also, the polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as the monomers, polymerization initiator, solvent and the like are preferable to be used after the reaction obstructing substances such as water, oxygen, carbon dioxide, protonic compound and the like are previously removed.

On the other hand, when the aromatic vinyl compound-conjugated diene compound copolymer having the polymerization active site is produced through the coordination polymerization, it is preferably to use a rare-earth metal compound as the polymerization initiator, more preferably a combination of the following ingredients (a), (b) and (c).

The ingredient (a) used in the coordination polymerization is selected from the rare-earth metal compound, a complex compound of the rare-earth metal compound and a Lewis base, and so on. As the rare-earth metal compound, carboxylate, alkoxide, β-diketone complex, phosphate, phosphite and the like of the rare-earth element are mentioned. As the Lewis base, acetylacetone, tetrahydrofuran, pyridine, N,N-dimethylformamide, thiophene, diphenyl ether, triethylamine, organophosphorus compound, monohydric or dihydric alcohol and so on are mentioned. As the rare-earth element of the rare-earth metal compound, lanthanum, neodymium, praseodymium, samarium and gadolinium are preferable. Among them, neodymium is particularly preferable. Also, as the ingredient (a), neodymium tri-2-ethylhexanoate and a complex compound with acetylacetone thereof, neodymium trineodecanoate and a complex compound with acetylacetone thereof, neodymium tri-n-butoxide and so on are mentioned. These ingredients (a) may be used alone or in a combination of two or more.

The ingredient (b) used in the coordination polymerization is selected from organoaluminum compounds. As the organoaluminum compound, a trihydrocarbyl aluminum represented by the formula: $R_3Al$, a hydrocarbyl aluminum hydride represented by the formula: $R_2AlH$ or $RAlH_2$ (wherein R is independently a hydrocarbon group having a carbon number of 1-30), a hydrocarbyl aluminoxane with a hydrocarbon group having a carbon number of 1-30 and so on are mentioned. As the organoaluminum compound, trialkyl aluminum, dialkyl aluminum hydride, alkyl aluminum dihydride, alkyl aluminoxane and so on are mentioned. These compounds may be used alone or in a combination of two or more. Moreover, as the ingredient (b) it is preferable to use a combination of the aluminoxane and another organoaluminum compound.

The ingredient (c) used in the coordination polymerization is selected from a hydrolyzable halogen-containing compound and a complex compound with the Lewis base thereof; organohalogen compounds having a tertiary alkyl halide, benzyl halide or allyl halide; ionic compounds composed of a non-coordinative anion and a counter cation; and so on. As the ingredient (c), alkylaluminum dichloride, dialkylaluminum chloride, silicon tetrachloride, tin tetrachloride, a complex of zinc chloride and a Lewis base such as alcohol or the like, a complex of magnesium chloride and a Lewis base such as alcohol or the like, benzyl chloride, t-butyl chloride, benzyl bromide, t-butyl bromide, triphenyl carbonium tetrakis(pentafluorophenyl)borate and so on are mentioned. These ingredients (c) may be used alone or in a combination of two or more.

The polymerization initiator may be previously prepared by using the above-described ingredients (a), (b) and (c), and if necessary the same conjugated diene compound and/or aromatic vinyl compound as the monomers for the polymerization. Moreover, it may be used by supporting a part or whole of the ingredient (a) or (c) on an inactive solid. The amount of each ingredient used may be properly set, and the amount of the ingredient (a) is typically 0.001 to 0.5 mmol per 100 g of the monomer. Also, a molar ratio of the ingredient (b)/ingredient (a) is preferably 5 to 1000, and a molar ratio of the ingredient (c)/ingredient (a) is preferably 0.5 to 10.

The polymerization temperature in the coordination polymerization is preferably within a range of −80 to 150° C., more preferably −20 to 120° C. As the solvent for the coordination polymerization, the hydrocarbon solvent inactive to the reaction mentioned in the anionic polymerization may be used, and the concentrations of the monomers in the reaction solution are the same as in the case of the anionic polymerization. Moreover, the reaction pressure in the coordination polymerization is the same as in the case of the anionic polymerization, and the starting materials used in the reaction are also preferable to be ones from which the reaction obstructing substances such as water, oxygen, carbon dioxide, protonic compound and the like are substantially removed.

When the polymerization active site of the copolymer having the polymerization active site is modified with the modifying agent, as the modifying agent, a nitrogen-containing compound, a silicon-containing compound and a tin-containing compound are preferably used. In this case, a nitrogen-containing functional group, a silicon-containing functional group or a tin-containing functional group can be introduced through a modification reaction.

The nitrogen-containing compound usable as the modifying agent is preferable to have a substituted or unsubstituted amino group, amide group, imino group, imidazole group, nitrile group or pyridyl group. The nitrogen-containing compound suitable for the modifying agent includes isocyanate compounds such as diphenylmethane diisocyanate, crude MDI, trimethylhexamethylene diisocyanate, tolylene diisocyanate and so on, 4-(dimethylamino)benzophenone, 4-(diethylamino)benzophenone, 4-dimethylaminobenzylidene aniline, 4-dimethylaminobenzylidene butylamine, dimethylimidazolidinone, N-methylpyrrolidone and the like.

Also, as the silicon-containing compound usable as the modifying agent, a hydrocarbyloxy silane compound represented by the following formula (III):

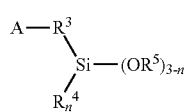

(III)

[wherein A is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid, carbonic acid dihydrocarbylester, cyclic tertiary amine, acyclic tertiary amine, nitrile, pyridine, sulfide and multi-sulfide; $R^3$ is a single bond or a bivalent inactive hydrocarbon group; $R^4$ and $R^5$ are independently a monovalent aliphatic hydrocarbon group having a carbon number of 1-20 or a monovalent aromatic hydrocarbon group having a carbon number of 6-18; n is an integer of 0-2; when plural $OR^5$s are existent, they may be same or different; and active proton and onium salt are not included in the molecule] and a partial condensate thereof are preferable, as well as a hydrocarbyloxy silane compound represented by the following formula (IV):

(IV)

(wherein $R^6$ and $R^7$ are independently a monovalent aliphatic hydrocarbon group having a carbon number of 1-20 or a monovalent aromatic hydrocarbon group having a carbon number of 6-18; p is an integer of 0-2; when plural $OR^7$s are existent, they may be same or different; and active proton and onium salt are not included in the molecule) and a partial condensate thereof.

In the functional group of A of the formula (III), imine includes ketimine, aldimine and amidine, and (thio)carboxylic acid ester includes an ester of an unsaturated carboxylic acid such as acrylate, methacrylate or the like, and acyclic tertiary amine includes N,N-disubstituted aromatic amine such as N,N-disubstituted aniline or the like, and cyclic tertiary amine can include (thio)ether as a part of a ring. As a metal of a metal salt of (thio)carboxylic acid, an alkali metal, an alkaline earth metal, Al, Sn, Zn and the like is mentioned.

As the bivalent inert hydrocarbon group in $R^3$, an alkylene group having a carbon number of 1-20 is preferable. The alkylene group may be straight, branched or cyclic, but the straight chain is particularly preferable. As the straight alkylene group, methylene group, ethylene group, trimethylene group, tetramethylene group, pentamethylene group, hexamethylene group, octamethylene group, decamethylene group, dodecamethylene group and the like are mentioned.

As $R^4$ and $R^5$, an alkyl group having a carbon number of 1-20, an alkenyl group having a carbon number of 2-18, an aryl group having a carbon number of 6-18, an aralkyl group having a carbon number of 7-18 and the like are mentioned. In this case, the alkyl group and alkenyl group may be straight, branched or cyclic, and include, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group, cyclohexenyl group and the like. Also, the aryl group may have a substituent on the aromatic ring such as lower alkyl group or the like, and includes, for example, phenyl group, tolyl group, xylyl group, naphthyl group and the like. Further, the aralkyl group may have a substituent on the aromatic ring such as lower alkyl group or the like, and includes, for example, benzyl group, phenetyl group, naphthylmethyl group and the like.

In the formula (III), n is an integer of 0-2 and preferably 0. Moreover, it is required that active proton and onium salt are not included in the molecule.

In the hydrocarbyloxy silane compound represented by the formula (III), as the (thio)epoxy group-containing hydrocarbyloxysilane compound, for example, 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl (methyl) dimethoxysilane and ones obtained by replacing the epoxy group in these compounds with a thioepoxy group may be mentioned. Among them, 3-glycidoxypropyl trimethoxysilane and 3-glycidoxypropyl triethoxysilane are particularly preferable.

As the imine group-containing hydrocarbyloxy silane compound, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine as well as trimethoxysilyl compounds, methyldiethoxysilyl compounds, ethyldiethoxysilyl compounds, methyldimethoxysilyl compounds, ethyldimethoxysilyl compounds and the like corresponding to these triethoxysilyl compounds may be mentioned. Among them, N-(1-methylpropylidene)-3-(triethoxysilyl)-1-propaneamine and N-(1,3-dimethylbutylidene)-3-(triethoxysilyl)-1-propaneamine are particularly preferable.

As the imine(amidine) group-containing compound, 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like are mentioned. Among them, N-(3-triethoxysilylpropyl)-4,5-dihydroimidazole is preferable.

As the carboxylic acid ester group-containing compound, 3-methacryloyloxypropyl triethoxysilane, 3-methacryloyloxypropyl trimethoxysilane, 3-methacryloyloxypropyl methyldiethoxysilane, 3-methacryloyloxypropyl triisopropoxysilane and the like are mentioned. Among them, 3-methacryloyloxypropyl trimethoxysilane is preferable.

As the isocyanate group-containing compound, 3-isocyanatopropyl trimethoxysilane, 3-isocyanatopropyl triethoxysilane, 3-isocyanatopropyl methyldiethoxysilane, 3-isocyanatopropyl triisopropoxysialne and the like are mentioned. Among them, 3-isocyanatopropyl triethoxysilane is preferable.

As the carboxylic anhydride-containing compound, 3-triethoxysilylpropyl succinic anhydride, 3-trimethoxysilylpropyl succinic anhydride, 3-methyldiethoxysilylpropyl succinic anhydride and the like are mentioned. Among them, 3-triethoxysilylpropyl succinic anhydride is preferable.

As the cyclic tertiary amine group-containing hydrocarbyloxysilane compound, 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidynyl)propyl(triethoxy)silane, 3-(1-pyrrolidynyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, 3-[10-(triethoxysilyl)decyl]-4-oxazoline and the like are mentioned. Among them, 3-(1-hexamethyleneimino)propyl(triethoxy) silane and (1-hexamethyleneimino)methyl(trimethoxy)silane are preferable.

As the acyclic tertiary amine group-containing hydrocarbyloxysilane compound, 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane and the like are mentioned. Among them, 3-diethylaminopropyl(triethoxy)silane and 3-dimethylaminopropyl(triethoxy)silane are preferable.

As the other hydrocarbyloxysilane compound, 2-(trimethoxysilylethyl)pyridine, 2-(triethoxysilylethyl)pyridine, 2-cyanoethyltriethoxy silane and the like are mentioned.

The hydrocarbyloxysilane compounds of the formula (III) may be used alone or in a combination of two or more. Also, a partial condensate of the hydrocarbyloxysilane compound may be used.

In the formula (IV), $R^6$ and $R^7$ are the same as mentioned on $R^4$ and $R^5$ of the formula (III), respectively.

As the hydrocarbyloxysilane compound represented by the formula (IV), tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, divinyldiethoxy silane and the like are mentioned for example. Among them, tetraethoxy silane is particularly preferable.

The hydrocarbyloxysilane compounds of the formula (IV) may be used alone or in a combination of two or more. Also, a partial condensate of the hydrocarbyloxysialne compound may be used.

As the modifying agent, a coupling agent represented by the following formula (V):

$$R^8{}_a Z X_b \quad\quad\quad (V)$$

[wherein $R^8$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a+b=4] is also preferable. The cold flow resistance of the copolymer (B) can be improved by modifying with the coupling agent of the formula (V). The copolymer (B) obtained by modifying with the coupling agent of the formula (V) has at least one of tin-carbon bond and silicon-carbon bond.

As $R^8$ in the formula (V), methyl group, ethyl group, n-butyl group, neophyl group, cyclohexyl group, n-octyl group, 2-ethylhexyl group and the like are mentioned. Moreover, as the coupling agent of the formula (V), $SnCl_4$, $R^8 SnCl_3$, $R^8{}_2 SnCl_2$, $R^8{}_3 SnCl$, $SiCl_4$, $R^8 SiCl_3$, $R^8{}_2 SiCl_2$, $R^8{}_3 SiCl$ and the like are preferable, and $SnCl_4$ and $SiCl_4$ are particularly preferable.

The modification reaction of the polymerization active site with the above modifying agent is preferable to be carried out by a solution reaction. In such a solution may be included monomers used in the polymerization. Also, the reaction system of the modification reaction is not particularly limited and may be a batch system or a continuous system. Further, the reaction temperature of the modification reaction is not particularly limited as long as the reaction proceeds, and the reaction temperature in the polymerization reaction may be adopted as it is. The amount of the modifying agent used is preferably within a range of 0.25 to 3.0 mol, more preferably 0.5 to 1.5 mol per 1 mol of the polymerization initiator used for producing the copolymer.

In the invention, the reaction solution containing the copolymer (B) may be dried to separate the copolymer (B) and then the resulting copolymer (B) may be compounded into the rubber component (A), or the reaction solution containing the copolymer (B) may be mixed with a rubber cement of the rubber component (A) at a solution state and then dried to obtain the mixture of the rubber component (A) and the copolymer (B).

The rubber composition according to the invention is preferable to further contain 30 to 90 parts by mass of a filler based on 100 parts by mass of the rubber component (A). When the amount of the filler compounded is less than 30 parts by mass, the fracture characteristics and wear resistance of the vulcanized rubber are insufficient, while when it exceeds 90 parts by mass, the workability tends to be deteriorated. As the carbon black, FEF, SRF, HAF, ISAF and SAF grade carbon blacks are preferable, and HAF, ISAF and SAF grade carbon blacks are more preferable. On the other hand, as the silica, precipitated silica, fumed silica and the like are preferable, and the precipitated silica is more preferable. These reinforcing fillers may be used alone or in a combination of two or more.

The rubber composition according to the invention may further contain a softening agent. As the softening agent, process oils such as a paraffinic oil, a naphthenic oil, an aromatic oil and so on are mentioned. The aromatic oil is preferable in view of the fracture characteristics and wear resistance, and the naphthenic oil and paraffinic oil are preferable in view of the low heat buildup and low-temperature characteristics. The amount of the softening agent compounded is not particularly limited, but the softening agent is preferably compounded so that a total amount of the low-molecular weight copolymer (B) and the softening agent compounded can be 2 to 80 parts by mass based on 100 parts by mass of the rubber component (A). When the total amount of the low-molecular weight copolymer (B) and the softening agent compounded exceeds 80 parts by mass, the fracture characteristics of the vulcanized rubber tend to be deteriorated.

additives usually used in the rubber industry such as an antioxidant, a silane coupling agent, a vulcanization accelerator, a vulcanization accelerating aid, a vulcanizing agent and the like can be properly compounded into the rubber composition of the invention within a scope of not damaging the object of the invention in addition to the above rubber component (A), the low-molecular weight aromatic vinyl compound-conjugated diene compound copolymer (B), the filler and the softening agent. As these additives, commercially available ones can be preferably used. The rubber composition can be produced by compounding the rubber component (A) with the low-molecular weight copolymer (B), and, if necessary, the properly selected additives and milling, warming, extruding and so on.

The pneumatic tire according to the invention is characterized by using the above rubber composition in at least the ground-contacting part of the tread portion. The tire using the rubber composition in at least the ground-contacting part of the tread portion is excellent in the low fuel consumption and steering stability. The pneumatic tire according to the invention is not particularly limited as long as the above rubber composition is used in at least the ground-contacting part of the tread portion, and can be produced by the usual method. Moreover, as a gas filled into the tire, usual air or air having a regulated partial oxygen pressure but also inert gases such as nitrogen, argon, helium and so on can be used.

EXAMPLES

The following examples are given in illustration of the invention and are not intended as limitations thereof.

Production Examples 1-4 of Copolymers (B)

To a pressure glass vessel of 800 mL dried and purged with nitrogen are added 300 g of cyclohexane, 40 g of 1,3-butadiene, 13 g of styrene and 0.90 mmol of ditetrahydrofuryl propane, and further added 0.90 mmol of n-butyl lithium (n-BuLi), and then polymerization reaction is conducted at 50° C. for 2 hours. The conversion is approximately 100%. Then, an amount shown in Table 1 of a modifying agent shown in Table 1 is immediately added to the polymerization system and further modifying reaction is conducted at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a copolymer (B-1)-(B-4).

<Production Method of Copolymer (B-5)>

To a pressure glass vessel of 800 mL dried and purged with nitrogen 300 g of cyclohexane, 40 g of 1,3-butadiene, 13 g of styrene and 0.90 mmol of ditetrahydrofuryl propane are added, and 0.90 mmol of n-butyl lithium (n-BuLi) is further added, and then polymerization reaction is conducted at 50° C. for 2 hours. The conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a copolymer (B-5).

<Production Methods of Copolymers (B-6) and (B-8)-(B-13)>

To a pressure glass vessel of 800 mL dried and purged with nitrogen, 300 g of cyclohexane, 40 g of 1,3-butadiene, 13 g of styrene and 0.90 mmol of ditetrahydrofuryl propane are added, and 0.90 mmol of n-butyl lithium (n-BuLi) is further added, and then polymerization reaction is conducted at 50° C. for 2 hours. The conversion is approximately 100%. Then, an amount shown in Table 2 of a modifying agent shown in Table 2 is immediately added to the polymerization system and further modifying reaction is conducted at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a copolymer (B-6), (B-8), (B-9), (B-10), (B-11), (B-12) or (B-13).

<Production Method of Copolymer (B-7)>

A copolymer (B-7) is obtained in the same manner as in the copolymer (B-5) except that 0.90 mmol of lithium hexamethylene imide prepared in situ [HMI-Li; a molar ratio of hexamethylene imine (HMI)/lithium (Li)=0.9] in terms of a lithium equivalent is used as the polymerization initiator instead of n-butyl lithium (n-BuLi).

<Production Methods of Copolymers (B-14)-(B-15)>

Copolymers (B-14)-(B-15) are obtained in the same manner as in the copolymers (B-6) and (B-8)-(B-13) except that 0.90 mmol of lithium hexamethylene imide prepared in situ [HMI-Li; a molar ratio of hexamethylene imine (HMI)/lithium (Li)=0.9] in terms of a lithium equivalent is used as the polymerization initiator instead of n-butyl lithium (n-BuLi).

The weight average molecular weight (Mw), microstructure and bound styrene content of the copolymers (B-1)-(B-15) produced as described above are measured according to the following methods. Results are shown in Tables 1 and 2.

(1) Weight Average Molecular Weight (Mw)

The weight average molecular weight (Mw) of each polymer as converted to polystyrene are measured through a gel permeation chromatography [GPC: HLC-8020 manufactured by TOSOH, column: GMH-XL (two series columns) manufactured by TOSOH, detector: differential refractometer (RI)] as a standard of monodisperse polystyrene.

(2) Microstructure and Bound Styrene Content

The microstructure of the polymer is determined by an infrared method (Morello method) and the bound styrene content of the polymer is determined from an integral ratio of $^1$H-NMR spectrum.

Then, a rubber composition having a compounding recipe as shown in Table 3 or 4 is prepared by using the copolymers (B-1)-(B-15) or aromatic oil, and further vulcanized at 160° C. for 15 minutes to obtain a vulcanized rubber, and the storage modulus (G') and loss tangent (tan δ) of the thus vulcanized rubber are measured according to the following methods. Results are shown in Tables 5-8.

(3) Storage Modulus (G') and Loss Tangent (tan δ)

The storage modulus (G') and loss tangent (tan δ) are measured at a temperature of 50° C., a frequency of 15 Hz and a strain of 5% by using a viscoelasticity measuring device manufactured by RHEOMETRICS Corporation, and are shown by an index on the basis that the storage modulus (G') and loss tangent (tan δ) of the rubber composition using the aromatic oil in each Table (i.e., the rubber composition of Comparative Example 1 in Table 5, the rubber composition of Comparative Example 3 in Table 6, the rubber composition of Comparative Example 5 in Table 7 and the rubber composition of Comparative Example 7 in Table 8) are respectively 100. As to the storage modulus (G'), the larger the index value, the higher the storage modulus. On the other hand, as to the

TABLE 1

|  |  | Copolymer (B-1) | Copolymer (B-2) | Copolymer (B-3) | Copolymer (B-4) | Copolymer (B-5) |
|---|---|---|---|---|---|---|
| Modifying agent | Kind | SnCl$_4$ | SiCl$_4$ | TEOS *1 | S340 *2 | not modified |
|  | Used amount (mmol) | 0.20 | 0.20 | 0.90 | 0.90 |  |
| Bound styrene content (mass %) |  | 25 | 25 | 25 | 25 | 25 |
| Vinyl bond content (%) |  | 65 | 65 | 65 | 65 | 65 |
| Weight average molecular weight (Mw) |  | 243,000 | 260,000 | 134,000 | 142,000 | 80,000 |

*1 Tetraethoxy silane.
*2 N-(1,3-dimethylbutylidene)-3-(triethoxysilyl)-1-propaneamine.

TABLE 2

|  |  | Copolymer (B-5) | Copolymer (B-6) | Copolymer (B-7) | Copolymer (B-8) | Copolymer (B-9) | Copolymer (B-10) | Copolymer (B-11) | Copolymer (B-12) | Copolymer (B-13) | Copolymer (B-14) | Copolymer (B-15) |
|---|---|---|---|---|---|---|---|---|---|---|---|---|
| Polymerization initiator | Kind | n-BuLi | n-BuLi | HMI-Li | n-BuLi | n-BuLi | n-BuLi | n-BuLi | n-BuLi | n-BuLi | HMI-Li | HMI-Li |
|  | Used amount (mmol) | 0.9 | 0.9 | 0.9 | 0.9 | 0.9 | 0.9 | 0.9 | 0.9 | 0.9 | 0.9 | 0.9 |
| Modifying agent | Kind | none | TTC *3 | none | MDI *4 | DEAB *5 | DMI *6 | NMP *7 | DMABA *8 | DMABB *9 | DMI *6 | MDI *4 |
|  | Used amount (mmol) | — | 0.9 | — | 0.9 | 0.9 | 0.9 | 0.9 | 0.9 | 0.9 | 0.9 | 0.9 |
| Bound styrene content (mass %) |  | 25 | 25 | 25 | 25 | 25 | 25 | 25 | 25 | 25 | 25 | 25 |
| Vinyl bond content (%) |  | 65 | 65 | 65 | 65 | 65 | 65 | 65 | 65 | 65 | 65 | 65 |
| Weight average molecular weight (Mw) |  | 8 × 10$^4$ | 24 × 10$^4$ | 8 × 10$^4$ | 16 × 10$^4$ | 8 × 10$^4$ | 8 × 10$^4$ | 8 × 10$^4$ | 8 × 10$^4$ | 8 × 10$^4$ | 8 × 10$^4$ | 8 × 10$^4$ |
| Glass transition point (° C.) |  | −25 | −25 | −25 | −25 | −25 | −25 | −25 | −25 | −25 | −25 | −25 |

*3 Tin tetrachloride.
*4 Crude MDI, MR400 manufactured by Nippon Polyurethane Industry Co., Ltd.
*5 N,N'-diethylamino benzophenone.
*6 Dimethylimidazolidinone.
*7 N-methylpyrrolidone.
*8 4-dimethylaminobenzylidene aniline.
*9 4-dimethylaminobenzylidene butylamine.

loss tangent (tan δ), the smaller the index value, the more excellent the low heat buildup.

TABLE 3

|  | (parts by mass) Formulation A |
|---|---|
| SBR *10 | 100 |
| Carbon black *11 | 27 |
| Silica *12 | 27 |
| Silane coupling agent *13 | 2.5 |
| Aromatic oil or Copolymer (B) *14 | 15 |
| Stearic acid | 2 |
| Antioxidant 6C *15 | 1 |
| Zinc white | 3 |
| Vulcanization accelerator DPG *16 | 0.8 |
| Vulcanization accelerator DM *17 | 1 |
| Vulcanization accelerator NS *18 | 1 |
| Sulfur | 1.5 |

*10 "#1500" manufactured by JSR Corporation or S-SBR synthesized according to the following method. The kind of SBR used is shown in Tables 5-6.
*11 Seast KH (trade mark, N339) manufactured by Tokai Carbon Co., Ltd.
*12 Nipsil AQ (trade mark) manufactured by Nippon Silica Industrial Co., Ltd.
*13 Si 69 (trade mark) manufactured by Degussa Corporation, bis(3-triethoxysilylpropyl) tetrasulfide.
*14 Aromatic oil or the kind of the copolymers (B-1)-(B-5) used is shown in Tables 5-6.
*15 N-(1,3-dimethylbutyl)-N'-phenyl-p-phenylenediamine.
*16 Diphenyl guanidine.
*17 Dibenzothiazyl disulfide.
*18 N-t-butyl-2-benzothiazyl sulfenamide.

according to a usual manner to obtain S-SBR. The resulting S-SBR has a bound styrene content of 25% by mass and a vinyl bond content of 60%.

TABLE 4

|  | (parts by mass) | |
|---|---|---|
|  | Formulation B | Formulation C |
| SBR *19 | 100 | 100 |
| Carbon black *20 | 70 | — |
| Silica *12 | — | 70 |
| Aromatic oil or Liquid SBR *21 | 30 | 30 |
| Stearic acid | 2 | 2 |
| Antioxidant *15 | 1 | 1 |
| Silane coupling agent *13 | — | 7 |
| Zinc white | 2.5 | 2.5 |
| Vulcanization accelerator DM *17 | 0.5 | 1 |
| Vulcanization accelerator DPG *16 | 0.3 | 1 |
| Vulcanization accelerator NS *18 | 0.5 | 1 |
| Sulfur | 1.5 | 1.5 |

*12, *13, *15, *16, *17 and *18 are the same meaning as in Table 3.
*19 "#1500" manufactured by JSR Corporation.
*20 ISAF, a nitrogen absorption specific surface area (N₂SA) = 111 m²/g.
*21 Aromatic oil or the kind of the liquid SBR [copolymers (B-5)-(B-15)] used is shown in Tables 7-8.

TABLE 5

The compounding recipe of the rubber composition is the formulation A.
"#1500" manufactured by JSR Corporation is used as SBR (*10).

|  | Comparative Example 1 | Comparative Example 2 | Example 1 | Example 2 | Example 3 | Example 4 |
|---|---|---|---|---|---|---|
| Aromatic oil or the kind of the copolymer (B) used | Aromatic oil | Copolymer (B-5) | Copolymer (B-1) | Copolymer (B-2) | Copolymer (B-3) | Copolymer (B-4) |
| Storage modulus (G') [index] | 100 | 115 | 130 | 128 | 125 | 122 |
| Loss tangent (tan δ) [index] | 100 | 93 | 88 | 90 | 83 | 80 |

TABLE 6

The compounding recipe of the rubber composition is the formulation A.
The synthesized S-SBR is used as SBR (*10).

|  | Comparative Example 3 | Comparative Example 4 | Example 5 | Example 6 | Example 7 | Example 8 |
|---|---|---|---|---|---|---|
| Aromatic oil or the kind of the copolymer (B) used | Aromatic oil | Copolymer (B-5) | Copolymer (B-1) | Copolymer (B-2) | Copolymer (B-3) | Copolymer (B-4) |
| Storage modulus (G') [index] | 100 | 112 | 127 | 125 | 121 | 120 |
| Loss tangent (tan δ) [index] | 100 | 92 | 85 | 88 | 80 | 78 |

(Synthesis Method of S-SBR)

A cyclohexane solution of butadiene (16%) and a cyclohexane solution of styrene (21%) are charged into a pressure glass vessel of 800 mL dried and purged with nitrogen so as to be 40 g of butadiene monomer and 10 g of styrene monomer, and 0.12 mmol of 2,2-ditetrahydrofuryl propane is charged and 0.24 mmol of n-butyl lithium (BuLi) is added thereto, and then polymerization is conducted in a warmed water bath at 50° C. for 1.5 hours. The conversion is approximately 100%. Thereafter, 0.5 mL of a solution containing 5% by weight of 2,6-di-t-butyl-p-cresol (BHT) in isopropanol is added to the polymerization system to stop the reaction. Then, it is dried As seen from Tables 5 and 6, the rubber compositions in Examples using the copolymers (B-1)-(B-4) having at least one functional group instead of the aromatic oil have a highly improved storage modulus (G') and a considerably lowered loss tangent (tan δ) as compared with the rubber compositions in Comparative Examples 1 and 3 using the aromatic oil. Also, the rubber compositions in Comparative Examples 2 and 4 using the unmodified copolymer (B-5) have a higher storage modulus (G') and a lower loss tangent (tan δ) than the rubber compositions in Comparative Examples 1 and 3 using the aromatic oil, but have a lower storage modulus (G') and a higher loss tangent (tan δ) than the rubber compositions in Examples.

TABLE 7

The compounding recipe of the rubber composition is the formulation B (containing carbon black).

|  | Aromatic oil or the kind of the copolymer (B) used | Storage modulus (G') [index] | Loss tangent (tan δ) [index] |
|---|---|---|---|
| Comparative Example 5 | Aromatic oil | 100 | 100 |
| Comparative Example 6 | Copolymer (B-5) | 120 | 93 |
| Example 9 | Copolymer (B-6) | 135 | 86 |
| Example 10 | Copolymer (B-7) | 137 | 88 |
| Example 11 | Copolymer (B-8) | 136 | 84 |
| Example 12 | Copolymer (B-9) | 134 | 88 |
| Example 13 | Copolymer (B-10) | 140 | 82 |
| Example 14 | Copolymer (B-11) | 136 | 89 |
| Example 15 | Copolymer (B-12) | 133 | 87 |
| Example 16 | Copolymer (B-13) | 130 | 90 |
| Example 17 | Copolymer (B-14) | 140 | 78 |
| Example 18 | Copolymer (B-15) | 139 | 80 |

TABLE 8

The compounding recipe of the rubber composition is the formulation C (containing silica).

|  | Aromatic oil or the kind of the copolymer (B) used | Storage modulus (G') [index] | Loss tangent (tan δ) [index] |
|---|---|---|---|
| Comparative Example 7 | Aromatic oil | 100 | 100 |
| Comparative Example 8 | Copolymer (B-5) | 112 | 94 |
| Example 19 | Copolymer (B-6) | 113 | 94 |
| Example 20 | Copolymer (B-7) | 118 | 90 |
| Example 21 | Copolymer (B-8) | 117 | 91 |
| Example 22 | Copolymer (B-9) | 120 | 87 |
| Example 23 | Copolymer (B-10) | 122 | 85 |
| Example 24 | Copolymer (B-11) | 120 | 89 |
| Example 25 | Copolymer (B-12) | 116 | 90 |
| Example 26 | Copolymer (B-13) | 115 | 91 |
| Example 27 | Copolymer (B-14) | 125 | 87 |
| Example 28 | Copolymer (B-15) | 123 | 86 |

As seen from Tables 7 and 8, the rubber compositions in Examples 10-18 and 20-28 using the copolymers (B-7)-(B-15) having one or more nitrogen-containing functional group instead of the aromatic oil have a highly improved storage modulus (G') and a considerably lowered loss tangent (tan δ) as compared with the rubber compositions in Comparative Examples 5 and 7 using the aromatic oil.

Also, the rubber compositions in Comparative Examples 6 and 8 using the unmodified copolymer (B-5) have a higher storage modulus (G') and a lower loss tangent (tan δ) than the rubber compositions in Comparative Examples 5 and 7 using the aromatic oil, but have a lower storage modulus (G') and a higher loss tangent (tan δ) than the rubber compositions in Examples.

Moreover, the rubber compositions in Examples 9 and 19 using the copolymer (B-6) obtained by modifying with tin tetrachloride have a low loss tangent (tan δ) in the formulation B using the carbon black as a filler, but have a high loss tangent (tan δ) in the formulation C using the silica as a filler and have a lower storage modulus (G') and a higher loss tangent (tan δ) than the rubber compositions in Examples 10-18 and 20-28.

The invention claimed is:

1. A rubber composition comprising 2 to 60 parts by mass of a low-molecular weight aromatic vinyl compound-conjugated diene compound copolymer (B) based on 100 parts by mass of a rubber component (A) composed of at least one of natural rubber and synthetic diene-based rubbers,
wherein the low-molecular weight aromatic vinyl compound-conjugated diene compound copolymer (B) has an aromatic vinyl compound content of 5 to 80% by mass, a vinyl bond content in a conjugated diene compound portion of 5 to 80% by mass, a weight average molecular weight as measured through a gel permeation chromatography and converted to polystyrene of 5,000 to 500,000 and at least one functional group,
the low-molecular weight aromatic vinyl compound-conjugated diene compound copolymer (B) is formed through a modification with a tin-containing compound, a silicon-containing compound or a nitrogen-containing compound,
the functional group of the low-molecular weight aromatic vinyl compound-conjugated diene compound copolymer (B) is a tin-containing functional group, a silicon-containing functional group or a nitrogen-containing functional group, in which the nitrogen-containing functional group is at least one selected from the group consisting of a substituted or unsubstituted amino group, imino group, imidazole group, nitrile group and pyridyl group,
the low-molecular weight aromatic vinyl compound-conjugated diene compound copolymer (B) has a weight average molecular weight as measured through a gel permeation chromatography before introduced with the functional group and converted to polystyrene of 50,000 to 150,000, and
the conjugated diene compound in the low-molecular weight aromatic vinyl compound-conjugated diene compound copolymer (B) is 1,3-butadiene or isoprene.

2. A rubber composition according to claim 1, wherein not less than 50% by mass of the rubber component (A) is styrene-butadiene copolymer rubber.

3. A rubber composition according to claim 1, wherein the aromatic vinyl compound in the low-molecular weight aromatic vinyl compound-conjugated diene compound copolymer (B) is styrene.

4. A rubber composition according to claim 1, wherein the conjugated diene compound in the low-molecular weight aromatic vinyl compound-conjugated diene compound copolymer (B) is 1,3-butadiene.

5. A rubber composition according to claim 1, which further contains 30 to 90 parts by mass of a filler based on 100 parts by mass of the rubber component (A).

6. A rubber composition according to claim 5, wherein the filler is carbon black and/or silica.

7. A rubber composition according to claim 1, wherein a total amount of the low-molecular weight aromatic vinyl compound-conjugated diene compound copolymer (B) and a softening agent compounded is 2 to 80 parts by mass based on 100 parts by mass of the rubber component (A).

8. A rubber composition according to claim 1, wherein the low-molecular weight aromatic vinyl compound-conjugated diene compound copolymer (B) has a weight average molecular weight as measured through a gel permeation chromatography and converted to polystyrene of 20,000 to 400,000.

9. A rubber composition according to claim 8, wherein the low-molecular weight aromatic vinyl compound-conjugated diene compound copolymer (B) has a weight average molecular weight as measured through a gel permeation chromatography and converted to polystyrene of 50,000 to 400,000.

10. A rubber composition according to claim 1, wherein the low-molecular weight aromatic vinyl compound-conjugated diene compound copolymer (B) has a glass transition point (Tg) of not higher than 0° C.

11. A rubber composition according to claim 1, wherein the low-molecular weight aromatic vinyl compound-conjugated diene compound copolymer (B) is formed through a polymerization using an organic alkaline metal compound or a rare-earth metal compound.

12. A rubber composition according to claim 11, wherein the organic alkaline metal compound is an alkyllithium.

13. A rubber composition according to claim 1, wherein the nitrogen-containing functional group is selected from the group consisting of a substituted amino group represented by the following formula (I):

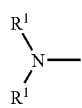

(I)

[wherein R' is independently an alkyl group having a carbon number of 1-12, a cycloalkyl group or an aralkyl group] and a cyclic amino group represented by the following formula (II):

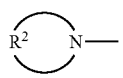

(II)

[wherein $R^2$ is an alkylene group having 3-16 methylene groups, a substituted alkylene group, an oxyalkylene group or a N-alkylamino-alkylene group].

* * * * *